US011221447B1

(12) United States Patent
Chen et al.

(10) Patent No.: US 11,221,447 B1
(45) Date of Patent: Jan. 11, 2022

(54) SUSPENDED CANTILEVER WAVEGUIDE

(71) Applicant: Acacia Communications, Inc., Maynard, MA (US)

(72) Inventors: Long Chen, Marlboro, NJ (US); Christopher Doerr, Middletown, NJ (US); Li Chen, Edison, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/794,759

(22) Filed: Feb. 19, 2020

Related U.S. Application Data

(62) Division of application No. 15/852,825, filed on Dec. 22, 2017, now Pat. No. 10,571,633.

(60) Provisional application No. 62/438,574, filed on Dec. 23, 2016, provisional application No. 62/438,554, filed on Dec. 23, 2016.

(51) Int. Cl.
*G02B 6/30* (2006.01)

(52) U.S. Cl.
CPC ................... *G02B 6/305* (2013.01)

(58) Field of Classification Search
CPC ................... G02B 6/305; G02B 6/00
USPC .......................................................... 385/43
See application file for complete search history.

(56) References Cited

U.S. PATENT DOCUMENTS

| | | | | |
|---|---|---|---|---|
| 4,186,996 A | * | 2/1980 | Bowen | G02B 6/3821 257/98 |
| 4,781,424 A | | 11/1988 | Kawachi et al. | |
| 5,381,503 A | * | 1/1995 | Kanamori | G02B 6/2552 385/123 |
| 5,473,721 A | * | 12/1995 | Myers | G02B 6/1221 264/1.24 |
| 6,694,071 B2 | * | 2/2004 | Hsu | G02B 6/3508 385/16 |
| 6,847,750 B1 | * | 1/2005 | Baumann | G02F 1/011 385/16 |
| 6,866,426 B1 | | 3/2005 | Steinberg et al. | |
| 6,987,898 B2 | | 1/2006 | Tran et al. | |
| 8,326,100 B2 | * | 12/2012 | Chen | G02B 6/1228 385/43 |
| 8,791,405 B2 | | 7/2014 | Ji et al. | |

(Continued)

FOREIGN PATENT DOCUMENTS

EP 1 400 822 A2 3/2004
EP 3 091 380 A1 11/2016

(Continued)

OTHER PUBLICATIONS

Chen et al. "Low-Loss and Broadband Cantilever Couplers Between Standard Cleaved Fibers and High-Index-Contrast Si3N4 or Si Waveguides" IEEEPhotTechLtrs V22No23 Dec. 2010 1744-6.

(Continued)

*Primary Examiner* — Kaveh C Kianni
(74) *Attorney, Agent, or Firm* — Joseph D'Angelo

(57) ABSTRACT

Cantilevered waveguides suspended above an air cavity in an underlying substrate are described. The waveguide is formed by patterning a waveguide layer in some embodiments, and the air cavity is formed by etching the substrate beneath the waveguide. The topside of the air cavity may be sealed by filling the openings used to etch the cavity with a sealant, such as optical epoxy. In some embodiments, the waveguide is a facet coupler, positioned at a chip facet.

7 Claims, 9 Drawing Sheets

(56) References Cited

U.S. PATENT DOCUMENTS

| | | |
|---|---|---|
| 8,815,704 B2 | 8/2014 | Meade et al. |
| 9,523,816 B2 | 12/2016 | Nakagawa et al. |
| 9,568,674 B2 | 2/2017 | Sandhu et al. |
| 9,618,699 B2 | 4/2017 | Tummidi et al. |
| 9,703,038 B1 | 7/2017 | Chen |
| 9,922,887 B2* | 3/2018 | Vermeulen ............ G01M 11/37 |
| 10,031,158 B1* | 7/2018 | Douglas ................ G01Q 20/02 |
| 2002/0031305 A1* | 3/2002 | Ticknor ............... G02B 6/3502 385/48 |
| 2002/0039467 A1* | 4/2002 | Amantea ............ G02B 6/12007 385/16 |
| 2002/0041739 A1 | 4/2002 | Wu |
| 2002/0172447 A1* | 11/2002 | MacDonald .......... G02F 1/0134 385/13 |
| 2003/0002426 A1* | 1/2003 | Shinohara .............. G11B 7/122 369/112.27 |
| 2003/0108274 A1* | 6/2003 | Haronian ............... G02B 6/122 385/17 |
| 2003/0123787 A1* | 7/2003 | Bona .................... G02B 6/3504 385/17 |
| 2004/0037488 A1* | 2/2004 | Guidotti ............... G02B 6/3536 385/16 |
| 2004/0042729 A1 | 3/2004 | Zhou et al. |
| 2004/0184709 A1* | 9/2004 | Kubby ................. G02B 6/3508 385/16 |
| 2005/0169566 A1* | 8/2005 | Takahashi ............... G02F 1/011 385/1 |
| 2005/0180678 A1* | 8/2005 | Panepucci ............. G01D 5/266 385/13 |
| 2006/0291794 A1* | 12/2006 | Liu ........................ G02B 6/358 385/140 |
| 2008/0049563 A1* | 2/2008 | Konno ................... G11B 7/124 369/13.24 |
| 2009/0003754 A1* | 1/2009 | Watanabe .............. G02B 6/136 385/1 |
| 2009/0007452 A1* | 1/2009 | Cho .......................... F26B 3/30 34/265 |
| 2009/0022457 A1 | 1/2009 | de Jong et al. |
| 2009/0274418 A1 | 11/2009 | Holzwarth et al. |
| 2010/0040327 A1 | 2/2010 | Deki et al. |
| 2011/0103733 A1* | 5/2011 | Tang ..................... G02B 6/283 385/1 |
| 2011/0116741 A1 | 5/2011 | Cevini et al. |
| 2011/0188112 A1* | 8/2011 | Stievater ................ G02F 1/355 359/332 |
| 2013/0015546 A1 | 1/2013 | Joe et al. |
| 2013/0294719 A1* | 11/2013 | Stievater ................ G02F 1/355 385/1 |
| 2013/0322811 A1 | 12/2013 | Meade |
| 2013/0322813 A1 | 12/2013 | Grondin et al. |
| 2013/0336346 A1 | 12/2013 | Kobrinsky et al. |
| 2014/0294341 A1 | 10/2014 | Hatori et al. |
| 2014/0341511 A1* | 11/2014 | Daems ................. G02B 6/3887 385/77 |
| 2015/0036975 A1* | 2/2015 | Burek ................... G02B 6/1223 385/31 |
| 2015/0063747 A1* | 3/2015 | Chen ................... G02B 6/3636 385/14 |
| 2015/0131100 A1* | 5/2015 | Reck ........................ G01L 1/246 356/445 |
| 2015/0293299 A1* | 10/2015 | Xu ........................ G02B 6/1228 385/28 |
| 2015/0316719 A1 | 11/2015 | Nakagawa et al. |
| 2015/0346431 A1 | 12/2015 | Budd et al. |
| 2016/0202414 A1* | 7/2016 | Englund .................... G03F 7/70 250/227.18 |
| 2016/0202421 A1 | 7/2016 | Chen |
| 2016/0327751 A1* | 11/2016 | Wu ....................... G02B 6/3584 |
| 2017/0052318 A1 | 2/2017 | Hofrichter et al. |
| 2017/0227456 A1* | 8/2017 | Tao ......................... G02B 6/122 |
| 2017/0253963 A1* | 9/2017 | Sabens ............... H01J 37/32247 |
| 2017/0288639 A1* | 10/2017 | Elsherbini .............. H03H 9/133 |
| 2017/0293073 A1* | 10/2017 | Chen ...................... G02B 6/138 |
| 2018/0003899 A1 | 1/2018 | Doerr et al. |
| 2018/0031599 A1* | 2/2018 | Rasras ................. G01P 15/0802 |
| 2018/0070157 A1* | 3/2018 | Menard ................ G02B 6/3518 |
| 2018/0266889 A1* | 9/2018 | Tao ........................ G01J 5/0803 |
| 2018/0299622 A1* | 10/2018 | Menard .................... G02B 6/00 |

FOREIGN PATENT DOCUMENTS

| | | |
|---|---|---|
| JP | 53-010445 A | 1/1978 |
| WO | WO 02/079831 A1 | 10/2002 |
| WO | WO 2009/134691 A1 | 11/2009 |

OTHER PUBLICATIONS

International Search Report and Written Opinion dated Mar. 23, 2016 in connection with International Application No. PCT/US2016/012657.

International Preliminary Report on Patentability dated Jul. 20, 2017 in connection with International Application No. PCT/US2016/012657.

* cited by examiner

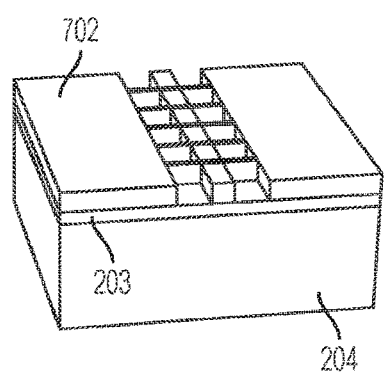 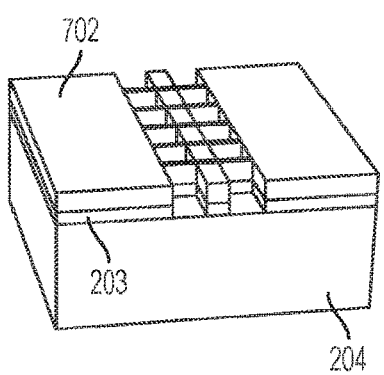 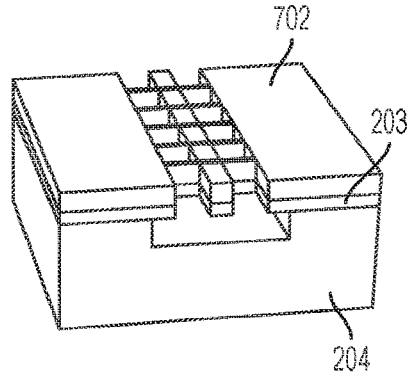
FIG. 8A  FIG. 8B  FIG. 8C
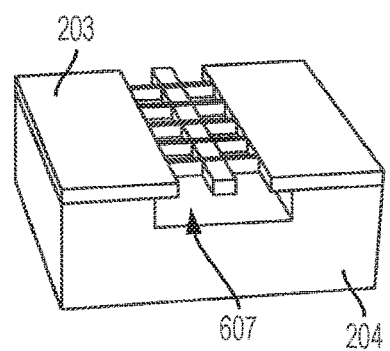 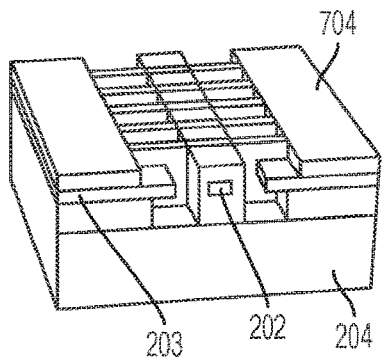 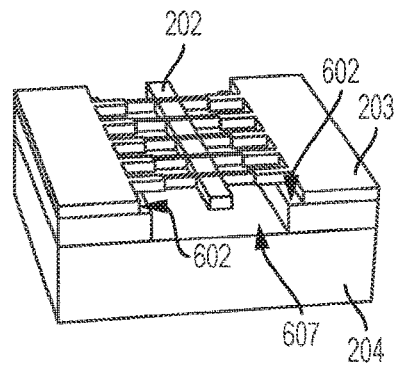
FIG. 8D  FIG. 8E  FIG. 8F

SUSPENDED CANTILEVER WAVEGUIDE

CROSS-REFERENCE TO RELATED APPLICATIONS

This Application is a Divisional Application of U.S. patent application Ser. No. 15/852,825, entitled "SUSPENDED CANTILEVER WAVEGUIDE" filed Dec. 22, 2017, which is hereby incorporated herein by reference in its entirety.

This application claims the benefit under 35 U.S.C. § 119(e) of U.S. Provisional Application Ser. No. 62/438,554, entitled "SUSPENDED CANTILEVER FILLED WITH AIR FOR IMPROVED THERMOMECHANICAL ROBUSTNESS" filed on Dec. 23, 2016, which is hereby incorporated herein by reference in its entirety.

This application claims the benefit under 35 U.S.C. § 119(e) of U.S. Provisional Application Ser. No. 62/438,574, entitled "SUSPENDED CANTILEVER WAVEGUIDE" filed on Dec. 23, 2016, which is hereby incorporated herein by reference in its entirety.

BACKGROUND

Field

The present application relates to optical facet couplers.

Related Art

Optical facet couplers are used to couple optical signals across a facet of a chip. Sometimes the chip is coupled to an optical fiber via the facet coupler. Sometimes the chip is coupled to another chip via the facet coupler. The facet coupler operates as a spot size converter in some devices to convert between an optical mode off the chip and an optical mode supported by a waveguide on the chip.

BRIEF SUMMARY

According to an aspect of the application, an optical facet coupler is provided, comprising a waveguide suspended above an air cavity by a plurality of tethers. In some embodiments, the waveguide is formed on a substrate and has an end adjacent a facet of the substrate. In some embodiments, the air cavity is a sealed air cavity.

According to an aspect of the application, a method of making a cantilevered optical facet coupler is provided, comprising forming a waveguide layer on a substrate, patterning the waveguide layer to define a waveguide and a plurality of tethers having openings between them, forming an air cavity underneath the waveguide by etching the substrate underneath the waveguide and the plurality of tethers, and sealing a topside of the air cavity by sealing the openings between the plurality of tethers.

According to an aspect of the application, an optical facet coupler is provided, comprising a substrate having an air cavity, a waveguide layer disposed on the substrate and including a waveguide disposed above the air cavity and a plurality of support beams suspending the waveguide, and a sealant configured to seal a topside of the air cavity.

According to an aspect of the application, an optical facet coupler is provided, comprising a substrate, a cantilevered waveguide suspended above an air cavity in the substrate, and means for sealing the air cavity.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIGS. 8A-8F illustrate an alternative non-limiting fabrication sequence for making the device of FIG. 6.

DETAILED DESCRIPTION

Some aspects of the present application provide optical facet couplers. Some optical facet couplers include a waveguide positioned above a cavity in a substrate. The substrate may be a semiconductor substrate, for example a silicon substrate or silicon-on-insulator (SOI) substrate. In some embodiments, the waveguide may be microfabricated by etching a waveguide layer disposed on the substrate. In some embodiments, the waveguide layer may be a dielectric film, for example a $SiO_2$ film. In some embodiments, the cavity in the substrate may be filled with an optical adhesive or epoxy. However, the inventors have appreciated that doing so may be problematic. For example, cracking of the facet coupler or delamination of the waveguide layer may occur because the epoxy can have a different coefficient of thermal expansion (CTE) than the surrounding materials of the photonic chip, and thus may expand at a greater rate than the substrate or waveguide layer materials. In some embodiments, a facet optical coupler comprises a waveguide suspended above an air cavity in an underlying substrate. The air cavity may be sealed on the topside using epoxy or another sealant. In some embodiments, suspending the waveguide above an air cavity avoids cracking, delamination, or other thermomechanical problems because there is no material in the cavity beneath the waveguide which could expand and pushing against the waveguide or the waveguide layer. In an alternative embodiment, a facet optical coupler comprises a waveguide positioned above a cavity filled with epoxy, with the waveguide being defined in a waveguide later having a setback from the cavity. In some embodiments, the setback allows for the epoxy in the cavity to expand without negatively pushing against the waveguide layer. In some embodiments, such as those described, improved thermomechanical robustness of a facet optical coupler may be provided, thus allowing the facet optical coupler to be employed in various devices operating across a range of temperatures.

The aspects and embodiments described above, as well as additional aspects and embodiments, are described further below. These aspects and/or embodiments may be used individually, all together, or in any combination of two or more, as the application is not limited in this respect.

Figure 1:
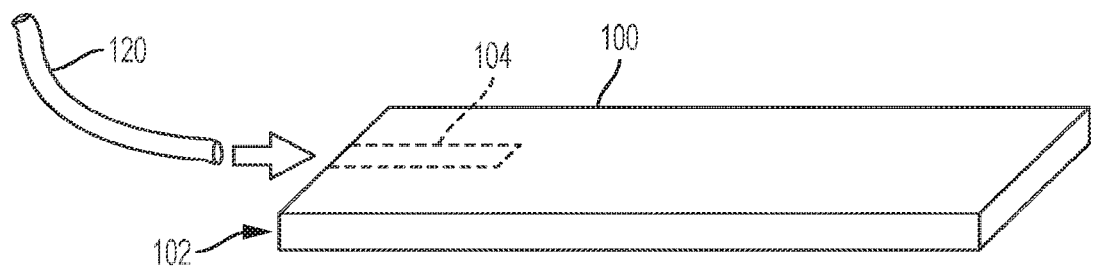
FIG. 1 illustrates a photonic integrated circuit coupled to an optical fiber at a facet, according to a non-limiting embodiment of the present application.

FIG. 1 illustrates a photonic integrated circuit (PIC) coupled to an optical fiber at a facet, according to a non-limiting embodiment of the present application. The PIC 100 includes a facet 102 and an optical facet coupler 104. The PIC 100 may include a substrate. For example, the PIC 100 may include a silicon substrate or other semiconductor substrate. The PIC 100 may include various optical components disposed on the substrate. The facet 102 may be formed by dicing the PIC 100 from a wafer, as a non-limiting example. In some embodiments, the facet 102 may be formed by plasma etching. The optical facet coupler 104 is a microfabricated waveguide in at least some embodiments and may have an end at the facet 102. The optical facet coupler 104 is shown in dashed lines as it may be below the top layer of the PIC 100 in some embodiments. The optical facet coupler 104 may couple the PIC to an off-chip (or "external") component. For example, the optical facet coupler 104 may couple the PIC 100 to an optical fiber 120 at the facet 102. The optical facet coupler 104 may be a spot size converter, configured to convert a spot size from the optical fiber 120 to the spot size usable by waveguides of the PIC 100.

Figure 2A:
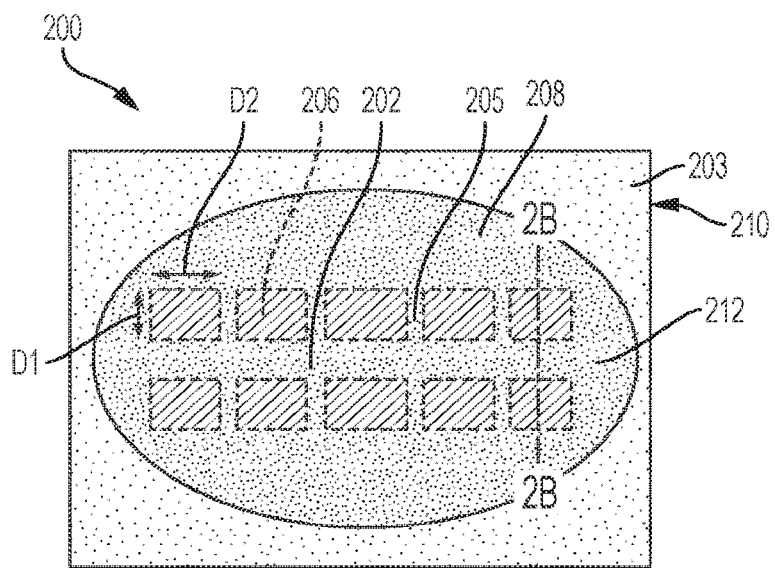
FIG. 2A illustrates a top view of a waveguide suspended above a sealed air cavity, according to a non-limiting embodiment of the present application.
Figure 2B:
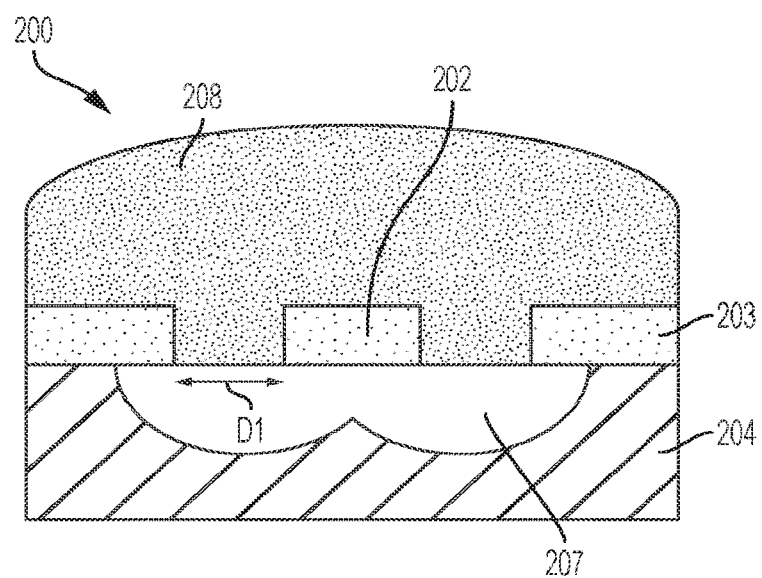
FIG. 2B illustrates a cross-section view of the suspended waveguide of FIG. 2A.

As described, in some embodiments an optical facet coupler comprises a waveguide suspended above a sealed air cavity. FIG. 2A illustrates a top view of a waveguide suspended above a sealed air cavity, according to a non-limiting embodiment of the present application. The illustrated device may be used as a facet coupler for a PIC of the type shown in FIG. 1, as a non-limiting example. The optical device 200 comprises a waveguide 202 formed in a waveguide layer 203 disposed on a substrate 204 (shown in FIG. 2B). The substrate 204 may be a semiconductor substrate, for example a silicon substrate or silicon on insulator (SOI) substrate. The waveguide layer 203 may be a dielectric film, for example $SiO_2$. The waveguide 202 is suspended from the main portion of the waveguide layer 203 by tethers 205 (also referred to herein as "supports" or "support beams"). The portion of the waveguide layer 203 to which the tethers 205 connect may alternatively be referred to herein as a "base portion" or "anchoring portion." Openings 206 in the waveguide layer 203 are formed by patterning the waveguide layer 203 to define the waveguide 202 and the tethers 205. The underlying substrate 204 may be etched via the openings 206, thus creating an air cavity 207 in the substrate 204 as shown in FIG. 2B. Thus, the openings 206 may be serve as etch holes (or access holes) in at least some embodiments. The topside of the air cavity 207 may then be sealed by a sealant 208. The sealant 208 may be an epoxy in some embodiments, although alternatively are possible.

The waveguide 202 may have any suitable dimensions for a given optical application, and may be positioned on a chip suitably to operate as a facet coupler. As shown in FIG. 2A, the waveguide 202 may be positioned near the facet 210 of the optical device and supported by an anchor 212 adjacent the facet 210. The waveguide 202 may be sized to couple to an optical fiber in some embodiments, or to another chip in some embodiments. In some embodiments, the waveguide 202 may be tapered to facilitate operation as a spot size converter.

FIG. 2B illustrates a cross-section view of the suspended waveguide of FIG. 2A taken along the dotted line 2B-2B. As shown, the waveguide 202 is suspended above the air cavity 207. In this non-limiting embodiment, the air cavity 207 includes two hemispherically shaped regions. Such a configuration may result from isotropic etching of the substrate 204, as described further below in connection with FIG. 3. Returning to FIGS. 2A and 2B, the topside of the air cavity 207 is sealed with the sealant 208. Although the sealant 208 is shown as having a rounded upper surface, such a configuration represents a non-limiting embodiment. In an alternative embodiment the sealant 208 may be planarized, for example by chemical mechanical polishing (CMP). The openings 206 may have suitable dimensions D1 and D2 to prevent the sealant 208 from entering the air cavity 207. In some embodiments, the dimensions D1 and D2 are selected such that the surface tension of the sealant 208 prevents the sealant from entering the air cavity 207, while at the same time the openings are sufficiently large to allow for etching of the underlying substrate 204. In some embodiments, D1 and D2 are each less than 30 microns. Alternative dimensions are possible.

Figure 2C:
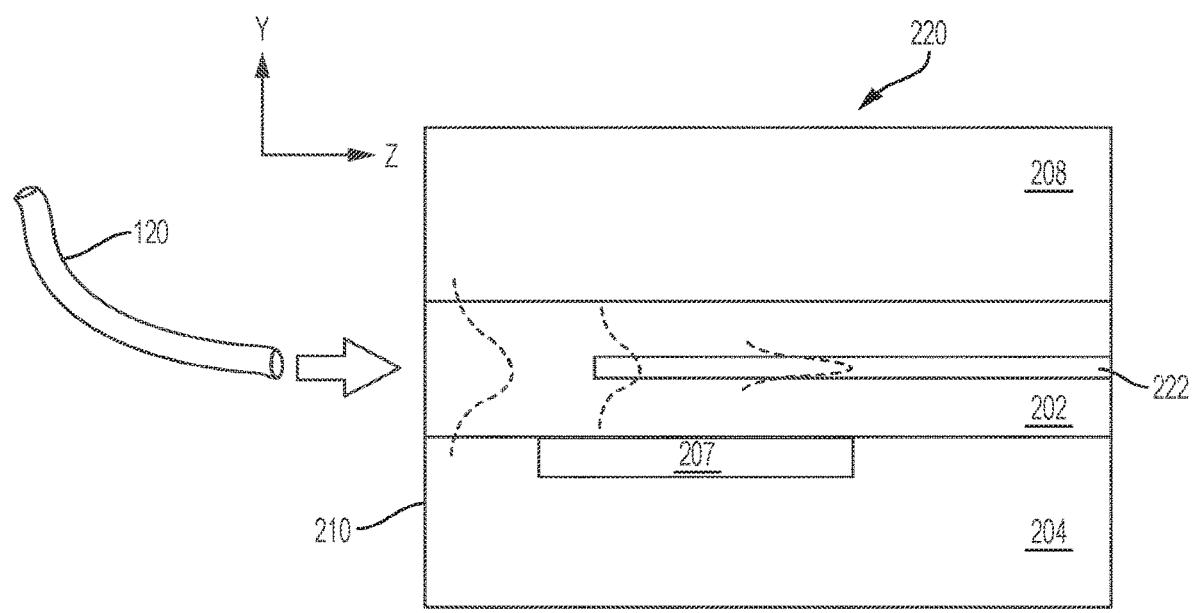
FIG. 2C illustrates a side view cross-section of a spot size converter comprising a waveguide suspended above an air cavity, according to a non-limiting embodiment of the present application.

FIG. 2C illustrates a side view of a spot size converter incorporating an optical device of the types shown in FIGS. 2A-2B having a waveguide suspended above a sealed air cavity. The spot size converter includes additional material layers not present in the embodiments of FIGS. 2A-2B. The spot size converter 220 includes the waveguide 202 optically coupled to a waveguide 222. In the non-limiting embodiment illustrated the waveguide 222 is disposed at least partially within the waveguide 202. Optical signals may be coupled between the waveguide 202 and the waveguide 222, in either direction. An optical fiber 120 may be coupled to the facet 210. Thus, the waveguide 202 may serve as a spot size converter, suspended above an air cavity 207 in the substrate 204.

The non-limiting embodiments of FIGS. 2A-2B illustrate a situation in which all the openings 206 are covered by the sealant 208. However, alternatives are possible. In some embodiments, one of more of the openings may be left open. For example, in some embodiments some of the openings 206 may be left open and others may be filled with the sealant 208.

The non-limiting embodiments of FIGS. 2A-2B illustrate a waveguide positioned adjacent a facet, such that the waveguide may serve as a facet coupler. This, however, is a non-limiting example. Alternatively, the waveguide 202 may be suspended above an air cavity positioned away from a facet of the substrate 204. For example, the air cavity 207 may be positioned under a portion of the waveguide positioned at a central location on the substrate, in some embodiments. Thus, it should be appreciated that some embodiments provide waveguides suspended above an air cavity when the waveguide is not a facet coupler.

Figure 3:
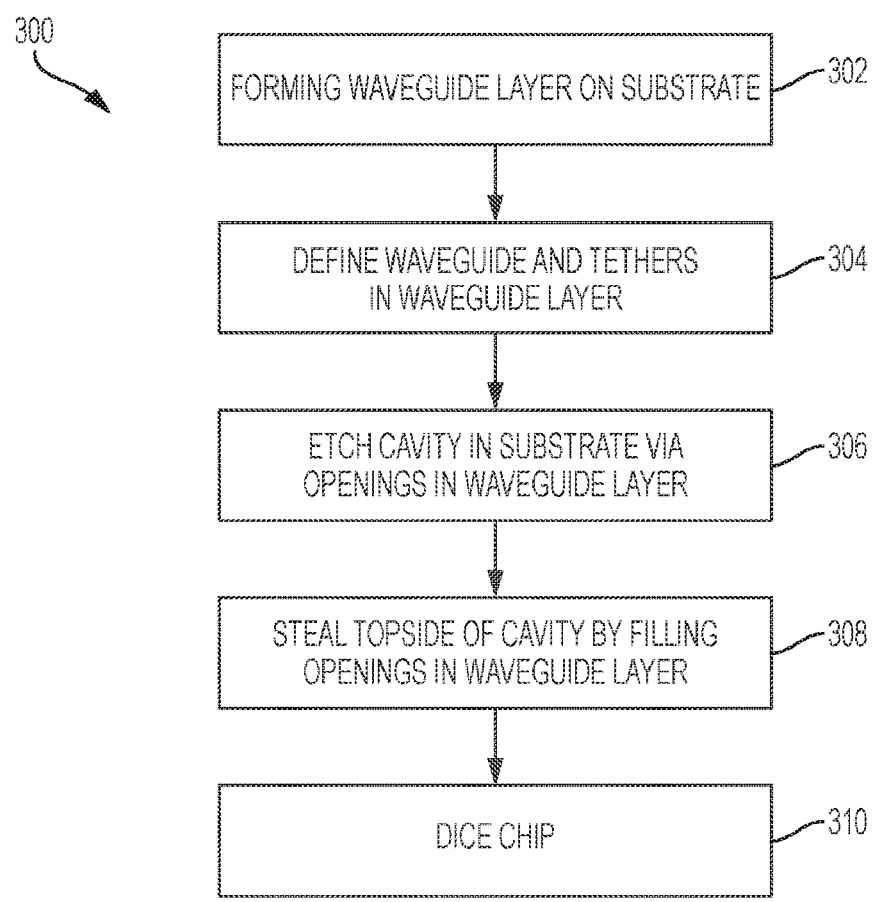
FIG. 3 is a flowchart of a fabrication method for making the suspended waveguide of FIG. 2A, according to a non-limiting embodiment of the present application.

The optical device 200 of FIG. 2A may be fabricated using microfabrication techniques. FIG. 3 is a flowchart of a fabrication method for making the suspended waveguide of FIG. 2A, according to a non-limiting embodiment of the present application.

The fabrication method 300 may begin at stage 302 by forming a waveguide layer on a substrate. In some embodiments, the substrate may be a silicon substrate and the waveguide layer may be a silicon oxide ($SiO_2$) layer formed on the substrate. However, alternative materials may be used. The waveguide layer may be formed by deposition or growth. The waveguide layer may be formed to have a thickness substantially corresponding to a desired thickness of the waveguide to be formed later.

Returning to FIG. 3, at stage 304 the waveguide and tethers may be defined in the waveguide layer. For example, photoresist and lithography techniques may be employed to define the waveguide and tethers. The tethers may have openings between them, such as the openings 206.

At stage 306 a cavity may be etched in the substrate underlying the waveguide layer, via the openings 206 in the waveguide layer. In some embodiments, the etch may be an isotropic etch to allow for release of the waveguide from the substrate. The resulting cavity is an air cavity 207 in at least some embodiments.

At stage 308, the topside of the air cavity is sealed by filling the openings in the waveguide layer which had served as the etch holes. The openings may be sealed using a sealant 208. For example, the sealant may be an epoxy in some embodiments, although alternative sealants may be used. The sealant may optionally be planarized after sealing the topside of the air cavity. As described previously in connection with FIGS. 2A-2B, in some embodiments one or more of the openings may be left opened, and thus stage 308 may involve filling one or more of the openings.

At stage 310, the photonic chip may be diced from a wafer to form a chip facet 210. The facet may be positioned such that the waveguide is near the facet and such that the waveguide may be coupled to an optical fiber in some embodiments.

Figure 4A:
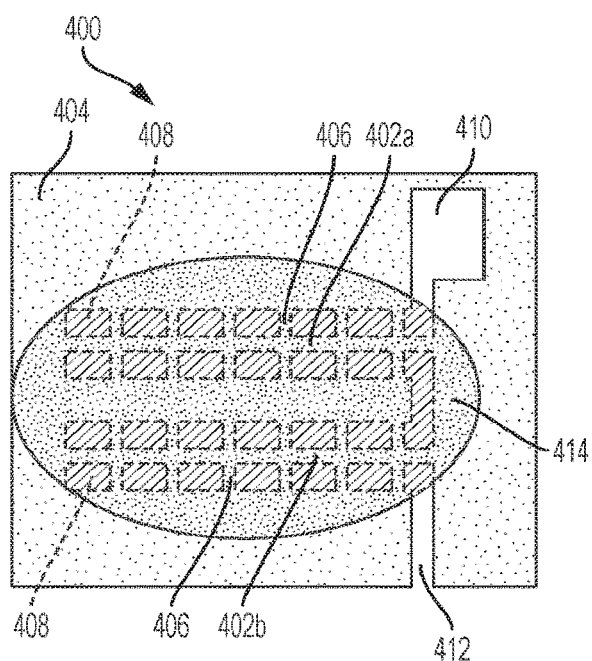
FIG. 4A is a top view of an alternative embodiment of a cantilevered waveguide suspended above an air cavity.
Figure 4B:
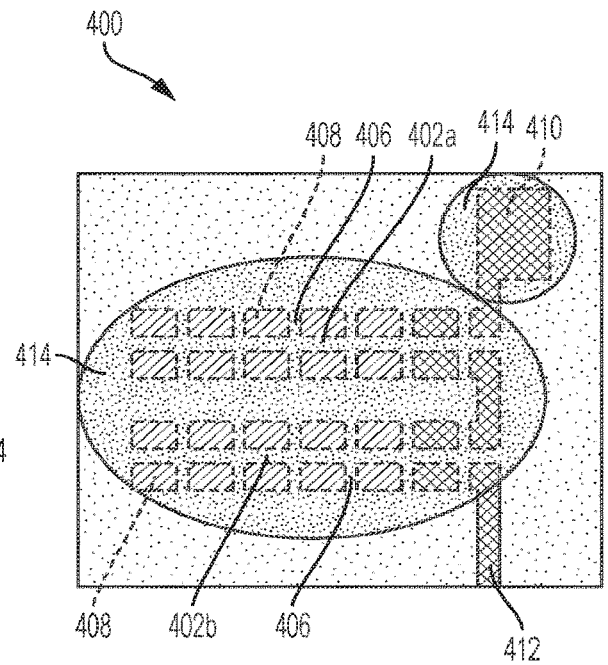
FIG. 4B illustrates the device of FIG. 4A upon sealing an end of the air cavity.
Figure 4C:
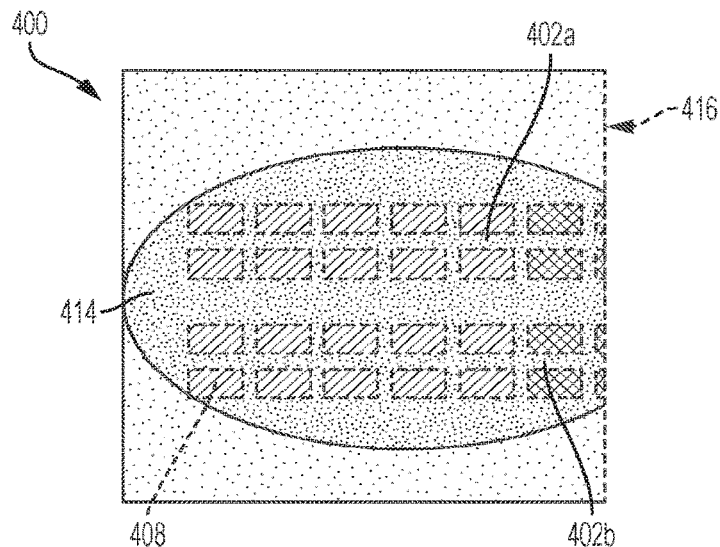
FIG. 4C shows the device of FIG. 4A after dicing, according to a non-limiting embodiment.

FIGS. 2A-2B illustrate a non-limiting embodiment of a microfabricated waveguide suspended above a sealed air cavity. An alternative embodiment is illustrated in FIGS. 4A-4C, in which both the topside and an end of the air cavity are sealed with a sealant. FIG. 4A is a top view of an alternative embodiment, showing a cantilevered waveguide suspended above an air cavity. The optical device 400 includes two waveguides 402a and 402b are defined in a waveguide layer 404. The waveguides are coupled to the main portion of the waveguide layer by tethers 406. Openings 408 in the waveguide layer may serve as etch holes, in the same manner described previously in connection with openings 206, and as will be described further below in connection with FIG. 5. Returning to FIG. 4A, the optical device further comprises a reservoir 410 and feeding channel 412.

An air cavity may be formed by etching the substrate beneath the waveguide layer 404, in the same manner described previously in connection with FIGS. 2A-2B. Returning to FIG. 4A, a sealant 414 may be used to seal the topside of the air cavity, or at least to partially seal the topside of the cavity. The sealant 414 may be the same type of sealant described previously in connection with sealant 208. After the sealant is used to seal the topside of the cavity, the sealant may be cured either with ultraviolet (UV) exposure, baking, or both. This curing process may be optional depending on the type of sealant employed.

FIG. 4B illustrates the device of FIG. 4A upon sealing an end of the air cavity. As shown, the reservoir 410 is filled with the sealant 414, for example epoxy, which flows through the feeding channel 412 and under an end of the waveguides 402a and 402b. The sealant 414 may travel only a limited distance into the air cavity. For example, the air cavity may be topside sealed prior to applying the sealant 414 to the reservoir 410, and thus the air pressure in the air cavity may prevent the sealant 414 from flowing far under the waveguides 402a and 402b. Additionally, or alternatively, only a small amount of sealant 414 may be placed in the reservoir 410 such that the amount is insufficient to fully fill the air cavity. In some embodiments, as shown in FIG. 4B, the sealant may thus extend under only part of the waveguides 402a and 402b. For example, in some embodiments less than 20% of the length of the waveguide may have sealant underneath it. In some embodiments, between 2% and 15% of the length of the waveguide may have sealant underneath it. In some embodiments, the amount of sealant underlying the waveguide is sufficiently small that cracking is unlikely to occur at elevated temperatures, and so that optical and mechanical performance of the cantilever is not compromised. In some embodiments, as shown in FIG. 4B, the topside and ends of the air cavity underlying the waveguides are sealed.

Referring back to FIG. 4B, after the sealant is positioned underneath an end of the cantilevered waveguides, sealant may be cured either with ultraviolet (UV) exposure, baking, or both. This curing process may be optional depending on the type of sealant employed.

FIG. 4C shows the optical device 400 of FIG. 4A after dicing, according to a non-limiting embodiment. That is, the optical device 400 may be diced to form a chip facet 416. Ends of the waveguides 402a and 402b may be positioned at the chip facet. As shown, the ends may be supported by the filler material from the feed channel, however the air cavity is not fully filled by the sealant. Dicing the chip may remove the reservoir and feeding channel in some embodiments.

Figure 5:
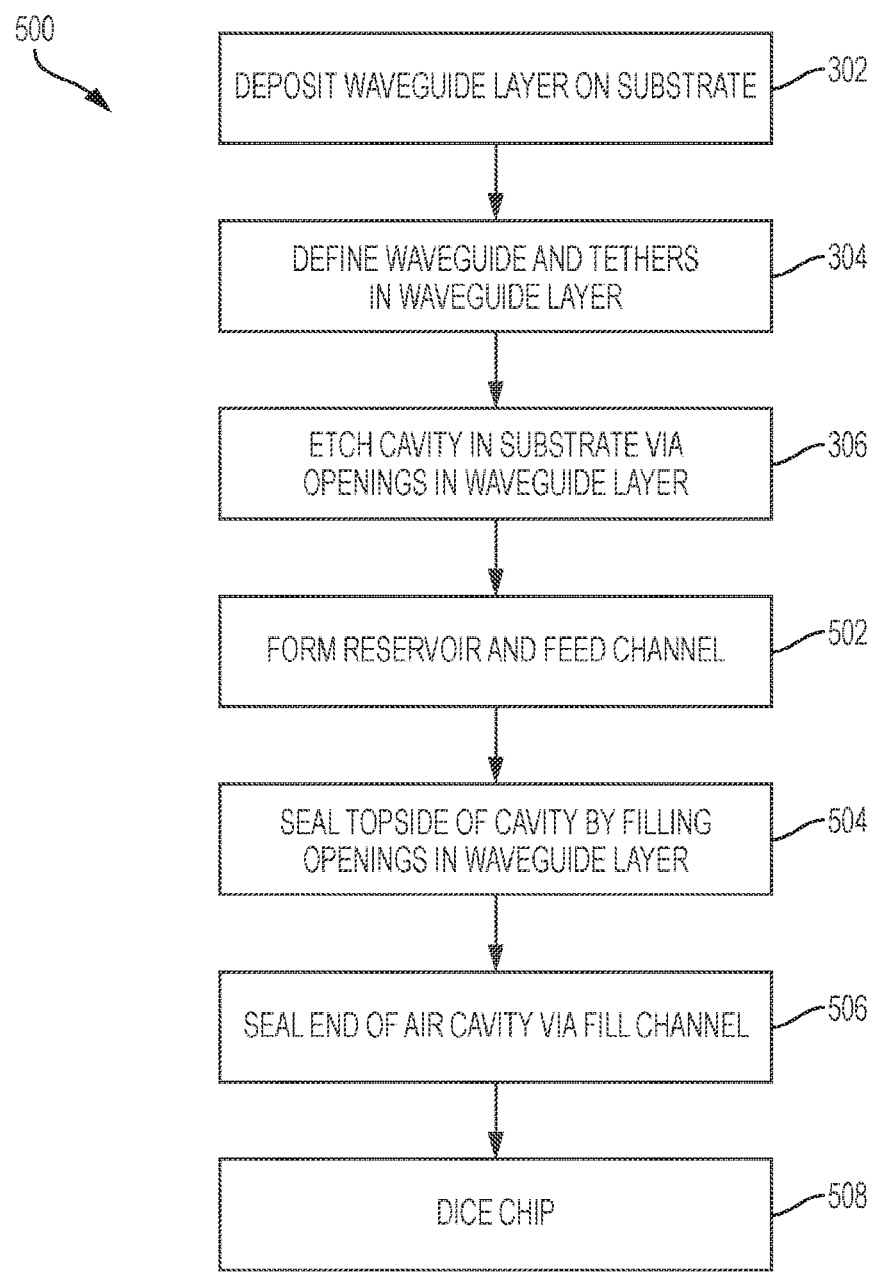
FIG. 5 is a flowchart of a fabrication method for making the cantilevered waveguide of FIG. 4C.

FIG. 5 is a flowchart of a fabrication method for making the cantilevered waveguide of FIG. 4C. As shown, the method 500 may begin with the stages 302, 304, and 306 described previously in connection with FIG. 3. Those stages are not described in detail here. Returning to FIG. 5, at stage 502, the method may involve forming the reservoir 410 and feed channel 412. In some embodiments, stages 306 and 502 may be combined into a single stage. That is, in the context of fabricating a device like that shown in FIGS. 4A-4C, the cavity, reservoir, and feed channel may be formed by the same etch process, according to a non-limiting embodiment.

Next, at stage 504, the topside of the air cavity may be sealant by filling the openings in the waveguide layer with a sealant. For example, sealant 414 may be used to fill the openings 408. The openings 408 may be dimensions suitably small to substantially prevent the sealant 414 from entering the air cavity, while at the same time being sufficiently large to allow for the etching of the substrate below the waveguide layer.

Next, at stage 506, an end of the air cavity may be sealed. For example, the reservoir may be filled with sealant, which may flow through the feeding channel to fill an end of the air cavity.

At stage 508, the chip may be diced. For example, the chip may be part of a wafer, and may be diced from the wafer. Dicing the chip may create a chip facet, with the waveguide (s) having an end positioned at the chip facet.

The method 500 is a non-limiting example of a manner of forming the optical device 400 of FIG. 4C. Alternative fabrication processes may be used.

As described previously, aspects of the present application provide a facet optical coupler comprising a waveguide positioned above a cavity filled with epoxy, with the waveguide being defined in a waveguide layer having a setback from the cavity. In some embodiments, the setback allows for the epoxy in the cavity to expand without negatively pushing against the waveguide layer. In some embodiments, improved thermomechanical robustness of a facet optical coupler may be provided, thus allowing the facet optical coupler to be employed in various devices operating across a range of temperatures.

Figure 6:
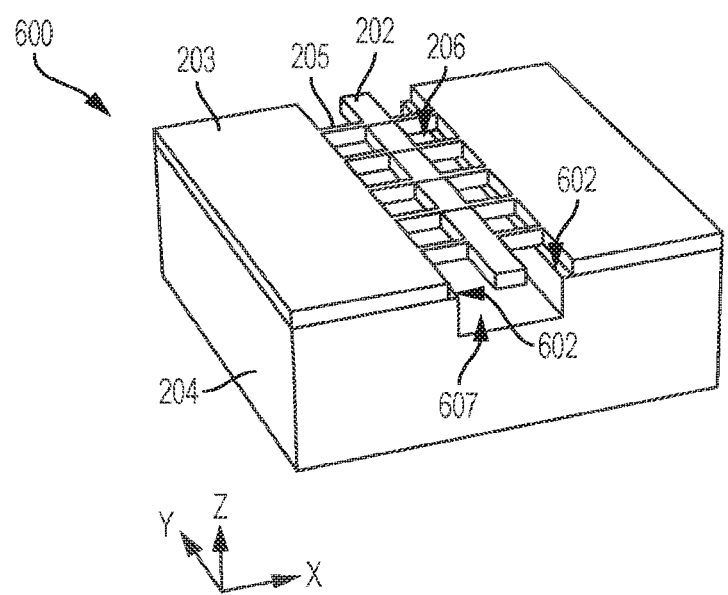
FIG. 6 illustrates a cantilevered waveguide having a setback from an edge of a cavity under the waveguide, according to a non-limiting embodiment of the present application.

FIG. 6 illustrates a cantilevered waveguide having a setback from an edge of a cavity under the waveguide, according to a non-limiting embodiment of the present application. Several of the components in the illustrated optical device 600 are the same as described in previously embodiments, and therefore have the same reference numbers. Those components are not described again in detail here.

As shown in FIG. 6, the optical device 600 includes the waveguide layer 203 positioned on the substrate 204. The waveguide layer 203 comprises the waveguide 202 and tethers 205. Openings 206 are formed between the tethers 205. In the illustrated state, the optical device 600 includes a cavity 607. As shown, the waveguide layer 203 is set back from the end of the cavity 207 by setback 602. The setback 602 may alternatively be referred to as a recess, reverse ledge, or standoff.

The setback 602 in some embodiments provides increased thermomechanical robustness to the optical device 600 compared to if the waveguide layer 203 was to overhang the edge of the cavity 607. In the illustrated state, the cavity 607 is empty to allow for visualization of the setback 602. However, in at least some embodiments, the cavity may be filled with a filler material, for example an epoxy. As described previously, the inventors have appreciated that filling a cavity beneath a cantilevered waveguide with an epoxy may be problematic in some situations because the epoxy may expand (when the optical device is exposed to raised temperatures) and push against the waveguide layer 203 and waveguide 202. Such expansion of an epoxy may thus cause cracking and/or delamination of the waveguide layer 203 and waveguide structures. However, the embodiment illustrated in FIG. 6 may avoid at least some such challenges. Because of the setback 602, epoxy (or other filler) in the cavity 607 that expands upward out of the cavity will not push on the underside of the waveguide layer 203, except perhaps for the relatively limited areas occupied by the waveguide 202 and tethers 205. In some embodiments, the setback 602 therefore provides improved thermomechanical behavior of the optical device 600.

The setback 602 may have assume various values in the x-direction of FIG. 6, as measured from the edge (or lip) of the cavity 607. For example, the setback 602 may be greater than zero micron, between 0.1 and 10 microns, between 0.5 and 5 microns, or any value or range of values within those ranges. The setback 602 may be selected to ensure the waveguide layer 203 does not overhang the cavity 207 taking into account manufacturing tolerances for the waveguide layer 203.

The optical device 600 of FIG. 6 may be fabricated in various ways. Two non-limiting fabrication sequences are now described.

FIGS. 7A-7F illustrate a first non-limiting fabrication sequence for making the optical device of FIG. 6. Beginning with FIG. 7A, the substrate 204 may have the waveguide layer 203 disposed thereon. At this stage, the waveguide 202 and tethers 205 are not yet patterned in the waveguide layer 203. A photoresist layer 702 is deposited on the waveguide layer 203 and patterned in the desired shape of the waveguide 202 and tethers 205.

Figure 7A:
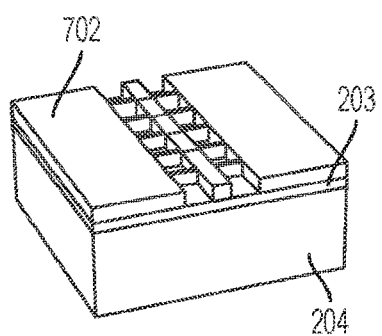
FIGS. 7A-7F illustrate a fabrication sequence for making the device of FIG. 6, according to a non-limiting embodiment of the present application.
Figure 7B:
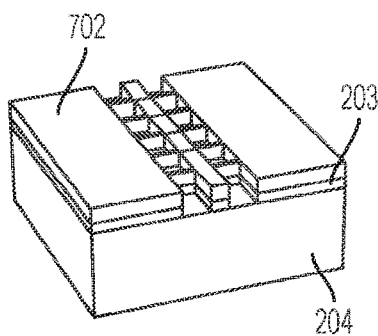
Figure 7C:
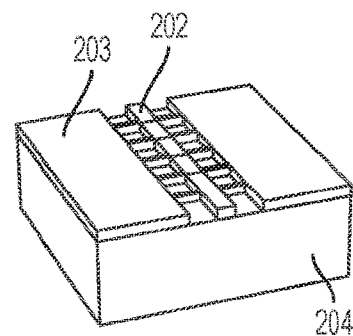

Referring to FIG. 7B, the waveguide layer 203 is etched using the photoresist layer 702 as a mask. The etch may be an anisotropic etch in some embodiments. As a result the waveguide layer 203 may now include the waveguide 202 and tethers 205. This result is shown in FIG. 7C, in which the photoresist layer 702 has been removed.

Figure 7D:
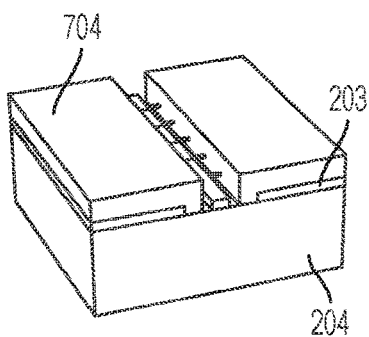

Referring to FIG. 7D, a second mask layer 704 may be deposited as shown. The mask layer 704 have overhang the waveguide layer 203 as shown. The mask layer 704 may be photoresist or any other suitable masking materials.

Figure 7E:
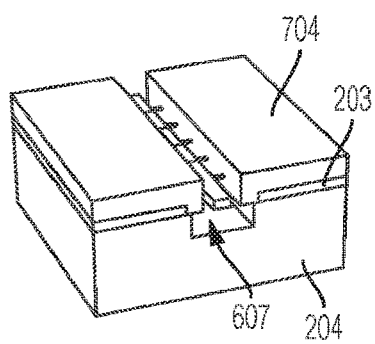

Referring to FIG. 7E, the substrate 204 may be etched to form the cavity 607. The etch may be an isotropic etch such that the cavity extends under the waveguide 202 and mask layer 704. The overhang of the mask layer over the edge of the waveguide layer 203 may result in the cavity 607 not being etching laterally to the same extent as was the waveguide layer 203. Thus, the setback 602 (shown in FIG. 6) is created.

Figure 7F:
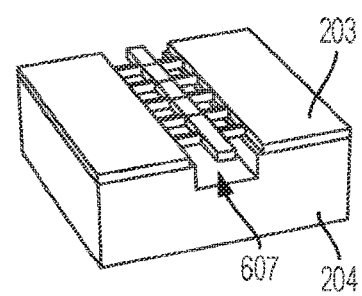

Referring to FIG. 7F, the mask layer 704 may be removed, providing the optical device 600 of FIG. 6. Optionally, epoxy or another filler material may be used to fill the cavity 607. In some embodiments, the epoxy or other filler material may serve as a cladding material for the waveguide 202.

FIGS. 8A-8F illustrate an alternative fabrication sequence for making the optical device 600 of FIG. 6. FIGS. 8A and 8B are the same as FIGS. 7A and 7B, meaning that the fabrication sequence of FIGS. 8A-8F begins in the same manner as the fabrication sequence of FIGS. 7A-7F.

Referring to FIG. 8C, the substrate 204 is etched to form the cavity 607. This is in contrast to FIG. 7C in which the photoresist layer 702 is removed. Referring again to FIG. 8C, the photoresist layer 702 remains on the structure to serve as a mask for etching the substrate 204. The etch may be an isotropic etch such that the cavity 207 undercuts the waveguide layer 203 as shown.

Referring to FIG. 8D, the photoresist layer 702 is removed, leaving the waveguide layer 203 on the substrate 204. As shown, the waveguide layer 203 overhangs the cavity 607 at this stage. As has been described previously, this overhand is undesirable in some embodiments because filling the cavity 207 with a filler material could result in pushing against the underside of the overhanding waveguide layer.

As shown in FIG. 8E a second masking layer is deposited. The masking layer may be photoresist or another suitable masking layer. As shown, the masking layer 704 surround the waveguide 202 and tethers 205, but is patterned to be set back from the edge of the waveguide layer 203 that overhangs the edge of cavity 607.

Referring to FIG. 8F, the waveguide layer may be etched using the mask layer 704 as a mask, and the mask layer 704 may then be removed. The resulting structure includes the setback 602 as shown in FIG. 6.

In some embodiments, an optical device such as optical device 600 of FIG. 6 may be fabricated using a small number of masks. For example, the fabrication sequences of FIGS. 7A-7F and 8A-8F use two masks. Alternative numbers of masks may be used in different fabrication sequences.

From the description of FIGS. 6, 7A-7F, and 8A-8F, it should be appreciated that aspects of the present application provide suspended cantilever structures for use in optical facet couplers. The suspended cantilever structures may exhibit improved thermomechanical robustness such that cracking is avoided when the cavity under the suspended cantilever is filled with optical adhesive and the structure is exposed to high temperatures.

According to an embodiment of the application, suspended cantilever waveguides are used in optical applications as facet couplers to allow coupling of an optical chip (e.g., a silicon photonics chip) with external structures such as an optical fiber. In some embodiments, the facet coupler serves as a spot size converter and may be termed a horizontal spot size converter. In some situations, a suspended cantilever is used as a waveguide to guide light and couple light to external sources such as optical fiber and to integrated waveguides on a chip. The cantilever is formed of $SiO_2$ or other similar materials in some embodiments. The suspended cantilever may be coupled to a supporting structure, such as a substrate (e.g., a silicon substrate or silicon-on-insulator substrate) by one or more support beams. The suspended cantilever itself may be formed by etching a cavity into the substrate, which may provide the benefit of reducing or eliminating optical leakage from the waveguide. The suspended structure may be created by etching with a single mask pattern. For example, an anisotropic etch may be performed on a dielectric film on the substrate, and the substrate may then be etched using an isotropic etch with the same mask pattern. It is desirable in at least some situations to fill the cavity under the cantilever with an optical adhesive.

In some embodiments, for example as shown in FIG. 6, the dielectric film does not overhang the edge of the cavity except for a relatively small length of the waveguide where the tethers couple the waveguide to the remainder of the dielectric film. Thus, the edges of the cavity may be substantially exposed (instead of being under the dielectric film). In some embodiments, a small portion of the dielectric film near the support beams may not be removed. As explained above, it is desirable in at least some embodiments to fill the cavity with optical adhesive. In some embodiments, the structure allows the adhesive to expand/shrink more freely with temperature, since there is limited or no dielectric material overhanging the cavity. Also, since the adhesive does not push directly under the dielectric film (except possibly under the support beams, which is a small percentage) in this configuration, large stresses causing cracking of the dielectric film may be avoided.

It should be appreciated from the foregoing that aspects of the present application provide a suspended cantilever formed from a dielectric material which does not overhang the underlying cavity in the substrate. The cavity may be filled with adhesive (e.g., optical adhesive) in some embodiments. The cantilever may be suspended by one or more support beams. The structure may be used as a facet optical coupler in a silicon photonics chip.

Aspects of the present application provide means for reducing or eliminating thermomechanical stresses in cantilevered waveguides. In some embodiments, the cantilevered waveguides are suspended over sealed or partially sealed air cavities. In some embodiments, the cantilevered waveguides are formed from waveguide layers having a setback from the end of a cavity in an underlying substrate. In some embodiments, means for suspending a waveguide above a substrate cavity are provided.

As described, in some embodiments cantilevered waveguides are provided. In some embodiments, the cantilevered waveguide may be a facet coupler. In some embodiments, the cantilevered waveguide may be a spot size converter. In some embodiments, the cantilevered waveguide may be a thermal optical phase shifter. Using a cantilevered waveguide can provide various benefits depending on the application. For example, in some embodiments leakage of light into an underlying substrate is reduced or eliminated. In some embodiments, heat conduction is reduced and therefore power efficiency increased. Other benefits are also possible.

Aspects of the present application provide cantilevered waveguides exhibiting good thermomechanical robustness and immunity to cracking at elevated temperatures. Aspects of the present application provide waveguide structures suspended over air cavities, which may be exposed to higher temperatures than waveguides overlying a cavity filled with epoxy in at least some embodiments. Also, the improved immunity to cracking and thermomechanical robustness may be achieved without reducing the cavity size (volume) compared to structures which use cavities filled with epoxy.

According to an aspect of the application, an optical facet coupler is provided, comprising a substrate, a cantilevered waveguide suspended above an air cavity in the substrate, and means for sealing the air cavity. In some embodiments, the means for sealing the air cavity comprises means for sealing a topside of the air cavity. In some embodiments, the means for sealing the air cavity comprises means for sealing an end of the air cavity.

The structures described herein may be used in various larger devices, such as in silicon photonics chips. Facet couplers and horizontal spot size converters may make use of the structures described herein.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. An optical facet coupler, comprising:
   a waveguide suspended above an air cavity by a plurality of tethers; wherein the waveguide is disposed on a chip and has a free end at a facet of the chip.

2. The optical facet coupler of claim 1, further comprising a sealant material sealing an end of the air cavity underneath the free end of the waveguide.

3. The optical facet coupler of claim 1, wherein the waveguide is disposed on a chip and has an anchor at a facet of the chip.

4. The optical facet coupler of claim 3, wherein the waveguide is disposed on a substrate, and wherein ends of the waveguide are supported by the substrate.

5. The optical facet coupler of claim 1, wherein the waveguide is part of a waveguide layer, wherein the waveguide layer comprises the plurality of tethers supporting the cantilevered waveguide, and wherein the optical facet coupler further comprises a filler material disposed in openings between the plurality of tethers.

6. The optical facet coupler of claim 5, wherein the filler material is epoxy.

7. The optical facet coupler of claim 1, wherein the waveguide has a varying width along its length.

\* \* \* \* \*